United States Patent [19]

Mueller

[11] 4,142,706

[45] Mar. 6, 1979

[54] AUTOMATIC SAMPLE CHANGER HAVING PLANAR TRANSPORT SURFACE

[75] Inventor: Anthony A. Mueller, Florence, Ky.

[73] Assignee: Actus, Inc., Florence, Ky.

[21] Appl. No.: 814,907

[22] Filed: Jul. 12, 1977

[51] Int. Cl.² .............................................. G01T 1/00
[52] U.S. Cl. ................................................ 250/328
[58] Field of Search ...................... 250/328; 198/339

[56] References Cited

U.S. PATENT DOCUMENTS

| 3,487,219 | 12/1969 | Smith et al. | 250/328 |
|---|---|---|---|
| 4,001,584 | 1/1977 | Mueller et al. | 250/328 |
| 4,024,395 | 5/1977 | Mueller et al. | 250/328 |

Primary Examiner—Davis L. Willis
Attorney, Agent, or Firm—Fleit & Jacobson

[57] ABSTRACT

Disclosed is an automatic sample changer having a planar upper surface for supporting a continuous chain of test tube conveying pucks. The test tubes being carried by the pucks contain samples such as gamma ray emitting biological samples. A sprocket drive gear pulls the pucks into a counting station where the test tubes being carried by the respective pucks are sequentially lowered into a detector region for analysis. After each count is completed, the sample test tube is returned to the surface, and is pushed out of the counting station when the next successive tube-carrying puck is pulled therein. Also disclosed is a disposal site whereby test tubes can be disposed of once the sample has been analyzed, an elevator for lowering and raising the tubes, and a mechanism for enabling the interruption of a long counting operation so as to admit a short count sequence.

13 Claims, 7 Drawing Figures

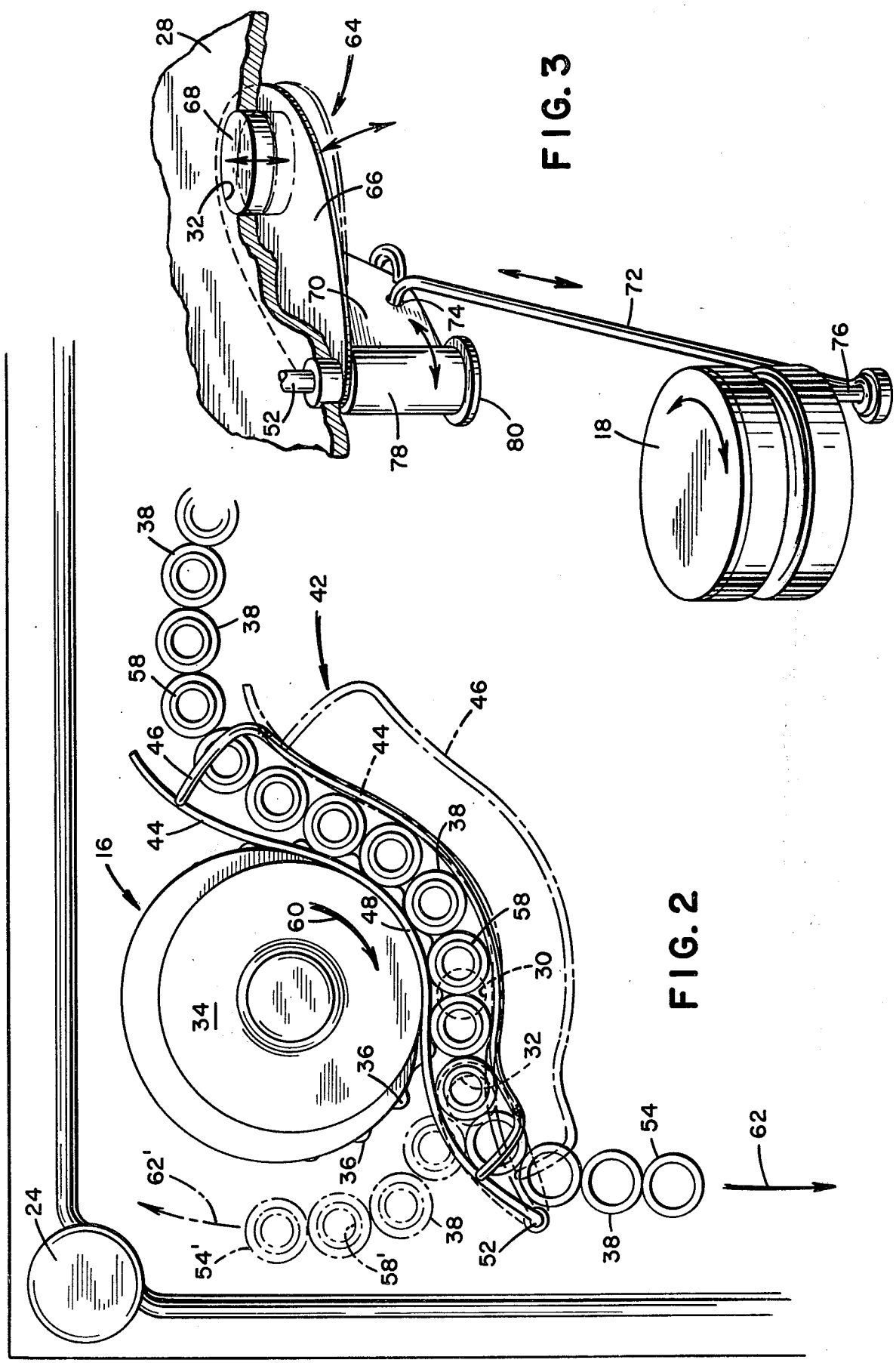

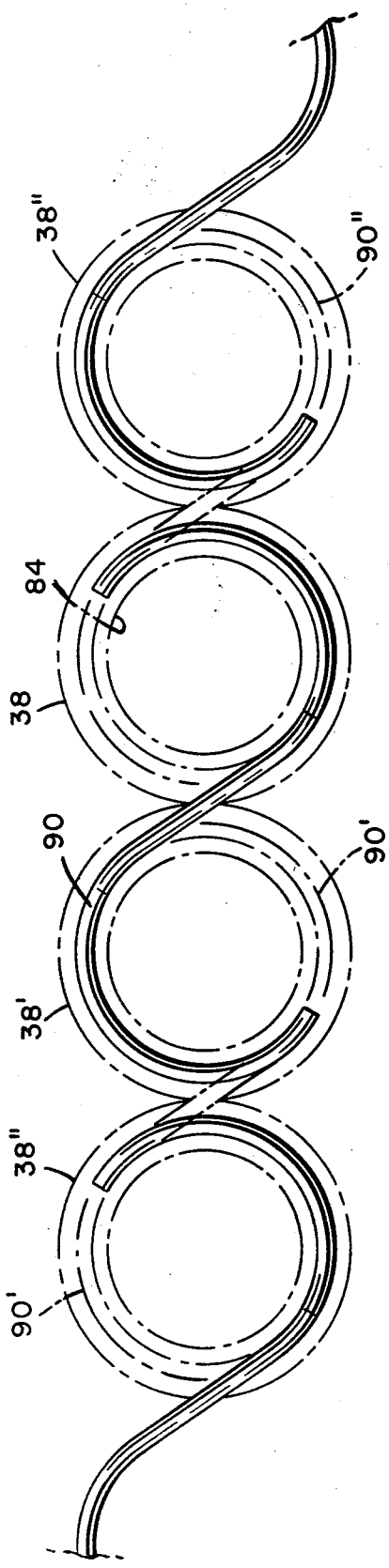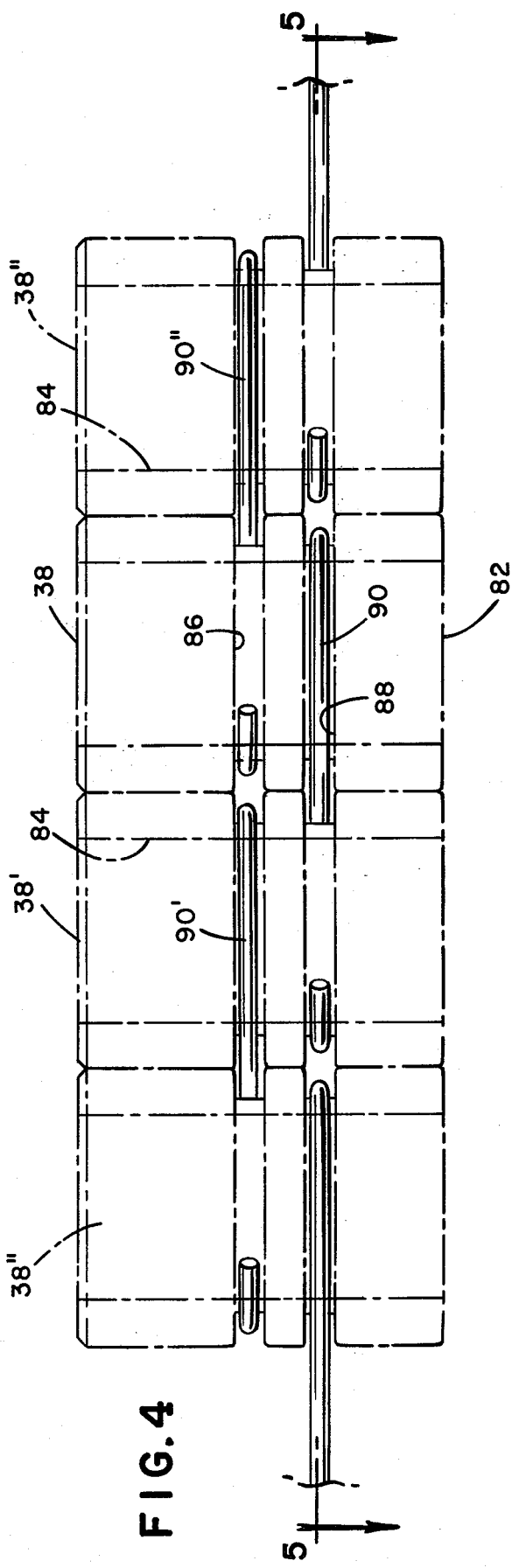

AUTOMATIC SAMPLE CHANGER HAVING PLANAR TRANSPORT SURFACE

BACKGROUND OF THE INVENTION

This invention relates generally to the field of automatic sample changers, and more particularly to radiation counters used in the practice of radioimmunoassay.

In U.S. Pat. No. 4,001,584, issued on Jan. 4, 1977, and assigned to the present assignee, there is disclosed a sample changer whereby a plurality of test tubes are conveyed along a specially designed track, and are then individually lowered into a counting station for radiation detection.

This sample changer was subsequently made more versatile; see U.S. Pat. No. 4,024,395 issued on May 17, 1977, and also assigned to the present assignee. In U.S. Pat. No. 4,024,395, a modular track assembly is disclosed, whereby the sample-handling capabilities of the sample changer are significantly expanded. Tracks for conveying 50, 100, 150, 200 and 300 samples are there disclosed.

Sample-handling capabilities have again been improved, as evidenced by co-pending U.S. Patent Application Ser. No. 814,986, filed concurrently herewith and assigned to the present assignee. This co-pending patent application discloses an efficient track unit capable of transporting up to 300 samples.

Two trends have developed in the field of automatic sample changers. The first is the steady increase in the sample-handling capabilities of automatic units. For while the first units were capable of handling 50 samples, later units were designed to handle 100, 150, 200, and now 300 samples. The second trend is somewhat at odds with the first. While it is desirable to expand sample-handling capabilities, it is also desirable to minimize the size of the sample changers.

As a result of the recent advances in the art, it is now possible to transport 150 samples in the same surface area originally used for but 50 samples. But still, there is room for expanding sample-handling capabilities without increasing size.

It is accordingly a principal object of the present invention to provide a compact automatic sample changer having expanded sample handling capabilities.

Increases in sample handling capabilities have not gone without developing their own specialized problems. One such problem relates to the difficultly encountered when transporting large numbers of samples. Co-pending U.S. Patent application Ser. No. 814,986 is directed to solving this particular problem.

A further object of the invention is to enable long runs of counting with ease of sample transport.

Another problem area relates to the ability of the changer to interrupt a long counting run to make room for a short run. With presently known devices, it is necessary either to remove test tubes from the area of the detector zone to make room for the short run, or to place a short run in existing unused spaces and index the sample changer until the short run is delivered to the detection zone.

It is accordingly a further object of the present invention to provide an automatic sample changer which is capable of readily accepting short runs of samples without the need for rearranging or indexing.

Another trend rapidly emerging in the medical field is the use of inexpensive, disposable components. This trend is in part related to the desirability of maintaining sterility at the highest possible level.

It is therefore another object of the present invention to provide an automatic sample changer which is designed to maximize sterility, and which is capable of accepting and disposing of disposable test tubes.

Still a further object of the present invention is to provide an automatic sample changer which is of relatively simple construction, without complex low-tolerance components.

The foregoing and other objects of the present invention, as well as many of the attendant advantages thereof, will become more readily apparent when reference is made to the following description, taken in conjunction with the accompanying drawings.

SUMMARY OF THE INVENTION

The present invention relates to an automatic sample changer having particular use in the field of radioimmunoassay. The inventive sample changer is designed with increased sample handling capabilities, and is of manageable size. In addition, the sample changer is designed to facilitate cleaning, can operate with disposable test tubes, and is of simplified construction. In addition, the inventive sample changer is capable of handling test tubes of different size without necessitating any structural modifications.

A planar, stainless steel plate serves as the surface for transporting samples. The samples are driven by a single sprocket gear, and are transported in pucks linked together for the maximum possible packing density. Once analyzed, the sample-containing test tubes can be automatically discharged from the changer. And should a spill occur, cleaning is facilitated by a pivotable detector cover. As such, the foregoing and other objects are realized.

BRIEF DESCRIPTION OF THE DRAWINGS

FIG. 2 is a top plan view of the transport mechanism illustrated in FIG. 1;

FIG. 3 is an illustration of the test tube disposal mechanism;

FIG. 4 is a schematic representation illustrating the manner in which sample transporting pucks are linked together;

FIG. 5 is a cross section taken along line 5—5 of FIG. 4;

DETAILED DESCRIPTION OF THE DRAWINGS

Figure 1:
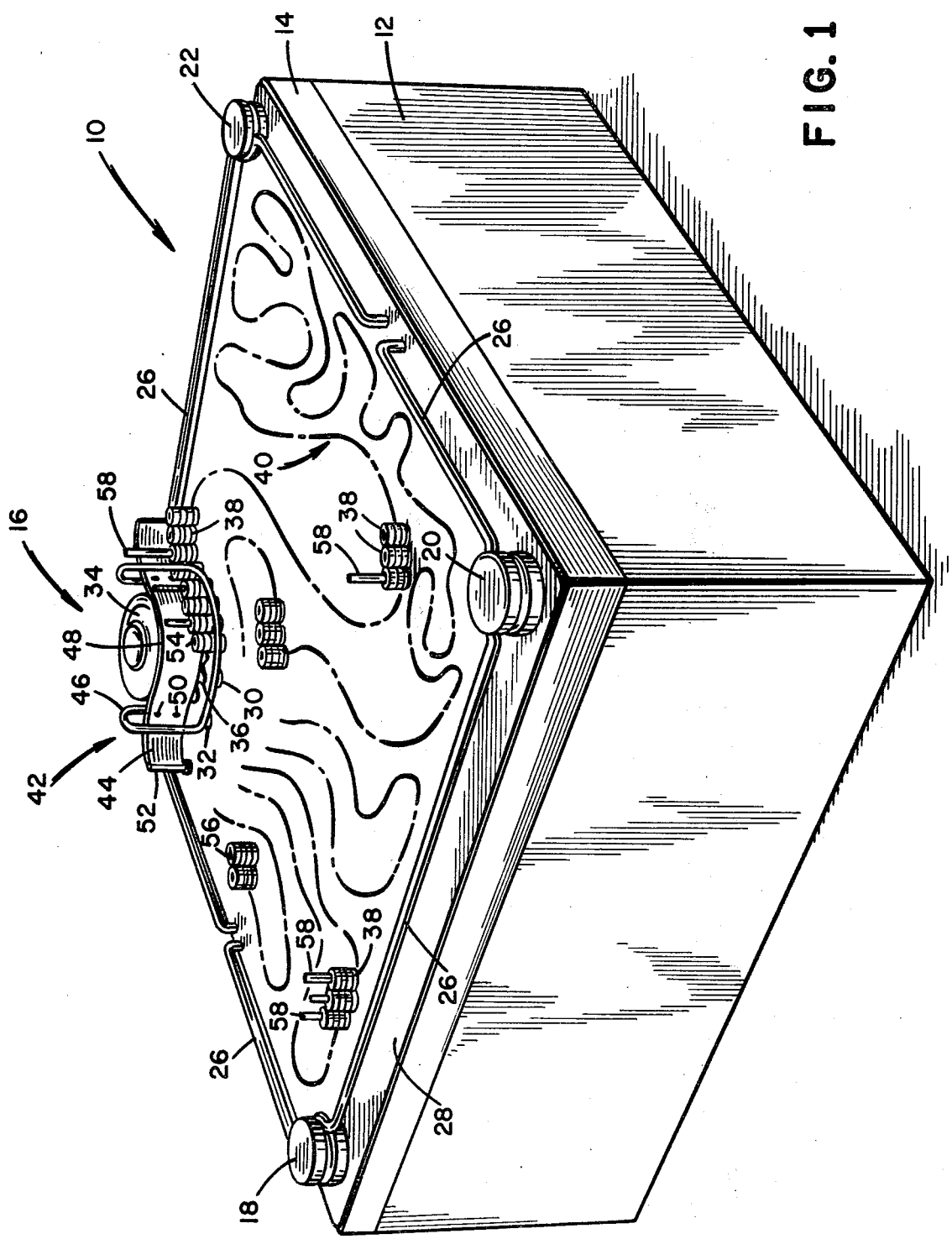
FIG. 1 is a perspective view of a sample changer designed in accordance with the teachings of the present invention.

With reference first to FIG. 1, the general configuration of the inventive sample changer will be described. The sample changer is shown generally at 10, and includes a base 12 and a top assembly 14. It is contemplated in the instant application that the base 12 be of a design similar to that disclosed in U.S. Pat. No. 4,024,395. Similarly, the top assembly 14 should be compatible with this known base unit, so as to take advantage of modular design. The present invention does, however, contemplate the use of a modified elevator assembly, and has the drive mechanism mounted on the top assembly 14.

Mounted near one corner of top assembly 14 is a drive unit 16. Pillars 18, 20, 22 and 24 (pillar 24 can be seen in FIG. 2) reside in the four corners of top assembly 14, and serve to support guide rod sections 26. The upper surface of top assembly 14, shown at 28, is planar. An elevator opening 30 and a tube disposal opening 32 are cut into surface 28, and are positioned in the region of drive unit 16.

The details of drive unit 16 and the associated guide assembly can be seen in FIGS. 1 and 2. A motor (not shown) is contained within a housing 34, and drives a sprocket gear 36. As seen best in FIG. 2, the contour of the respective sprocket teeth are such that they cooperate with pucks 38 to drive a transport chain shown generally at 40.

Mounted adjacent drive unit 16 is a guide assembly shown generally at 42. Guide assembly 42 comprises a contoured shield 44 and an associated guide rail 46. The central section of shield 44, shown at 48, is shaped to conform to the shape of the sprocket gear 36. Guide rail 46 is fixed to shield 44 by rivets 50 or the like, and for reasons which will become clear from the following paragraphs, shield 44 and guide rail 46 are mounted for pivotal movement about pivot rod 52.

As illustrated in FIG. 1, the transport chain 40 begins with puck 54 and ends at puck 56. Chain 40 is continuous, and takes a random orientation on plate 28. Each puck 38, or select pucks of the chain 40, receives a sample-filled test tube, some of which are designed at 58.

Through a mechanism which will be described below when reference is made to FIGS. 4 and 5, the respective pucks 38 of chain 40 are in intimate contact with their neighboring pucks. In this manner, "packing" of the pucks 38 and therefore the associated test tubes 58 can be maximized. Specifically, the sample changer 10 illustrated in FIG. 1 is capable of supporting 240 pucks. In the same surface area, the sample changer disclosed in U.S. Pat. No. 4,001,584 operated with fifty pucks.

As seen in FIG. 2 in solid lines, shield 44 abuts motor housing 34, and guide rail 46 is spaced from shield 44 by a distance slightly in excess of the outside diameter of a puck 38. It can also be seen that the teeth of sprocket gear 36 extend beyond the shield 44, and hence cooperate in intimate contact with the respective pucks 38. Therefore, when sprocket gear 36 is rotated in the direction of arrow 60, the lead pucks are urged out of the region of drive unit 16, as shown by arrow 62, while the lagging pucks are pulled into the drive unit. It can be seen that as the pucks are pushed from drive unit 16, they take a random orientation. At the same time, the randomly oriented pucks toward the rear of chain 40 are pulled from their random orientation into drive unit 16.

As noted above, sample changer 10 is designed to accommodate 240 pucks, and hence 240 sample-filled test tubes. Once set up and in the process of a long run, it would be difficult to interrupt such a run to intersperse a short run of say, for example, six tubes. It is for this reason that the guide assembly 42 is pivotally mounted about rod 52. For as shown in FIG. 2 in phantom, the guide assembly 42 can be swung away from motor housing 34 so that the rear side of shield 44 is spaced from sprocket 36 a distance slightly in excess of the outside diameter of a puck 38. In this way, a short run can be manually fed into sample changer 10, between the rear surface of shield 44 and the motor housing 34. A short chain of pucks is illustrated in phantom at 54', and the exit direction of the pucks from the region of guide assembly 42 is indicated by arrow 62'.

As noted previously, it is contemplated that the inventive sample changer be used with disposable test tubes. The mechanism for accomplishing this is best illustrated in FIGS. 1 and 3. With particular reference to FIG. 3, it will be noted that the tube disposal opening 32 in the plate 28 can be closed by means of a closure mechanism shown generally at 64. Closure mechanism 64 comprises a pivotable arm 66 on which is mounted a projecting button 68. As can be seen, the height of button 68 conforms to the thickness of plate 28, and the diameter of button 68 is slightly smaller than the diameter of tube disposal opening 32. Arm 66 is provided with a reinforcing rib 70, and yet arm 66 is flexible enough so that button 68 may be manually moved out of the plane of plate 28. A link 72 is connected at 74 to one end of the reinforcing rib 70, and the other end is connected to a pin 76 on the bottom of rotatable pillar 18. The rear surface of arm 66 is formed into a sleeve shown at 78, which fits over pivot rod 52. An abutment surface 80 associated with rod 52 maintains arm 66 against the lower surface of plate 28.

The structure of the tube transport puck 38 and the manner in which the respective pucks are connected together are illustrated in FIGS. 4 and 5. There, it can be seen that each of pucks 38 is cylindrical, has a planar bottom surface 82, and includes a cylindrical central opening 84. Two circumferential grooves, 86 and 88, are cut into the outer surface of each puck 38. Two "S" links 90 associate with each puck 38, in the respective grooves 86 and 88. As shown in FIG. 4, link 90 connects together pucks 38 and 38'. Link 90', on the other hand, connects puck 38' to puck 38".

It should be noted that the respective grooves 86 and 88 are cut into the surface of pucks 38 to a depth sufficient to accept link 90. In this manner, adjacent pucks may be maintained in intimate contact with one another; this intimate contact maximizes the number of pucks which may be provided in a given field.

The specific construction of the elevator mechanism will be described below when reference is made to FIGS. 6 and 7. Now, however, the basic operation of the inventive sample changer will be described. Initially, a transport chain of an appropriate number of pucks is positioned on the surface 28 of sample changer 10. The transport chain is associated with the drive unit 16 as illustrated in FIG. 1, and the pucks are loaded with test tubes containing samples. If the test tubes are of the disposable type, pillar 18 is rotated while pressure is exerted on the top of button 68 of arm 66 so that tube disposal opening 30 is opened. A disposal chute (not shown) associates with opening 30, and leads from opening 30 to the exterior of base 12.

Preliminary settings are made on the front panel of the sample changer, as described in U.S. Pat. Nos. 4,001,584 and 4,024,395, and a sample run is initiated. Specifically, the drive unit 16 is electrically actuated, and the motor moves sprocket gear 36 through one index. This moves the first puck 38 in chain 40 immediately over the elevator opening 30. The elevator mechanism is then electrically actuated, and the test tube housed in the first puck 38 is lowered into the detector housed in base 12, and a count is made and recorded. The elevator then returns the test tube to the surface 28. The uppermost elevator position is electrically sensed, as will be explained below, and the motor indexes sprocket gear 36 so that the next puck and associated test tube are placed in alignment with elevator opening 30. This operation is then repeated for the next test tube.

When the first test tube in the chain 40 reaches the tube disposal opening 32, and assuming that the opening 32 is open, the tube will fall from its puck, and will be expelled from the sample changer through an ejector chute. This operation continues until each test tube in the chain 40 has been interrogated. Naturally, if the test tubes are of the non-disposable type, button 68 will be positioned to close the opening 32, and the test tubes will travel with their respective pucks and remain on the surface 28 of the sample changer.

Figure 6:
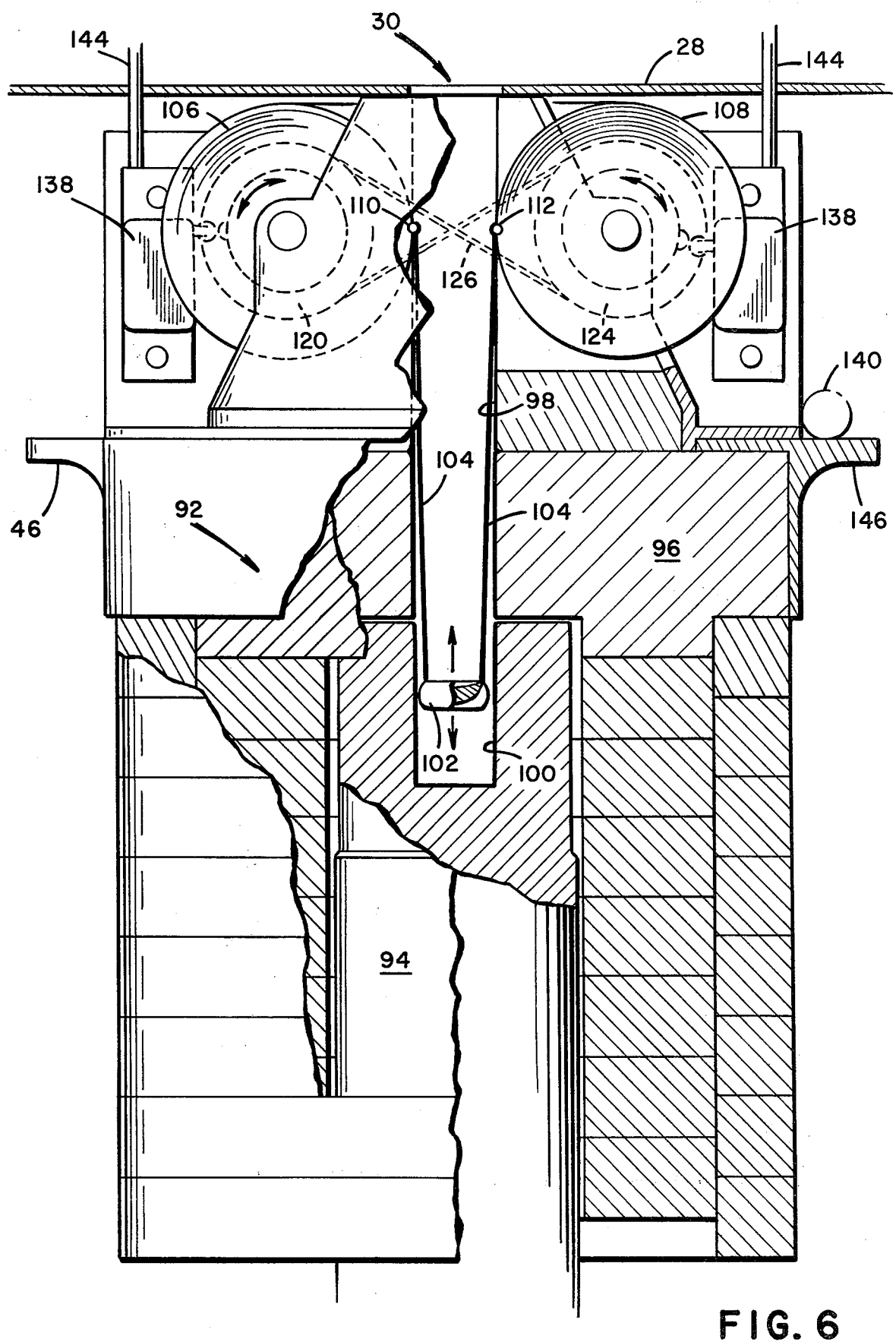
FIG. 6 is a side view, in partial cross section, of the elevator mechanism.
Figure 7:
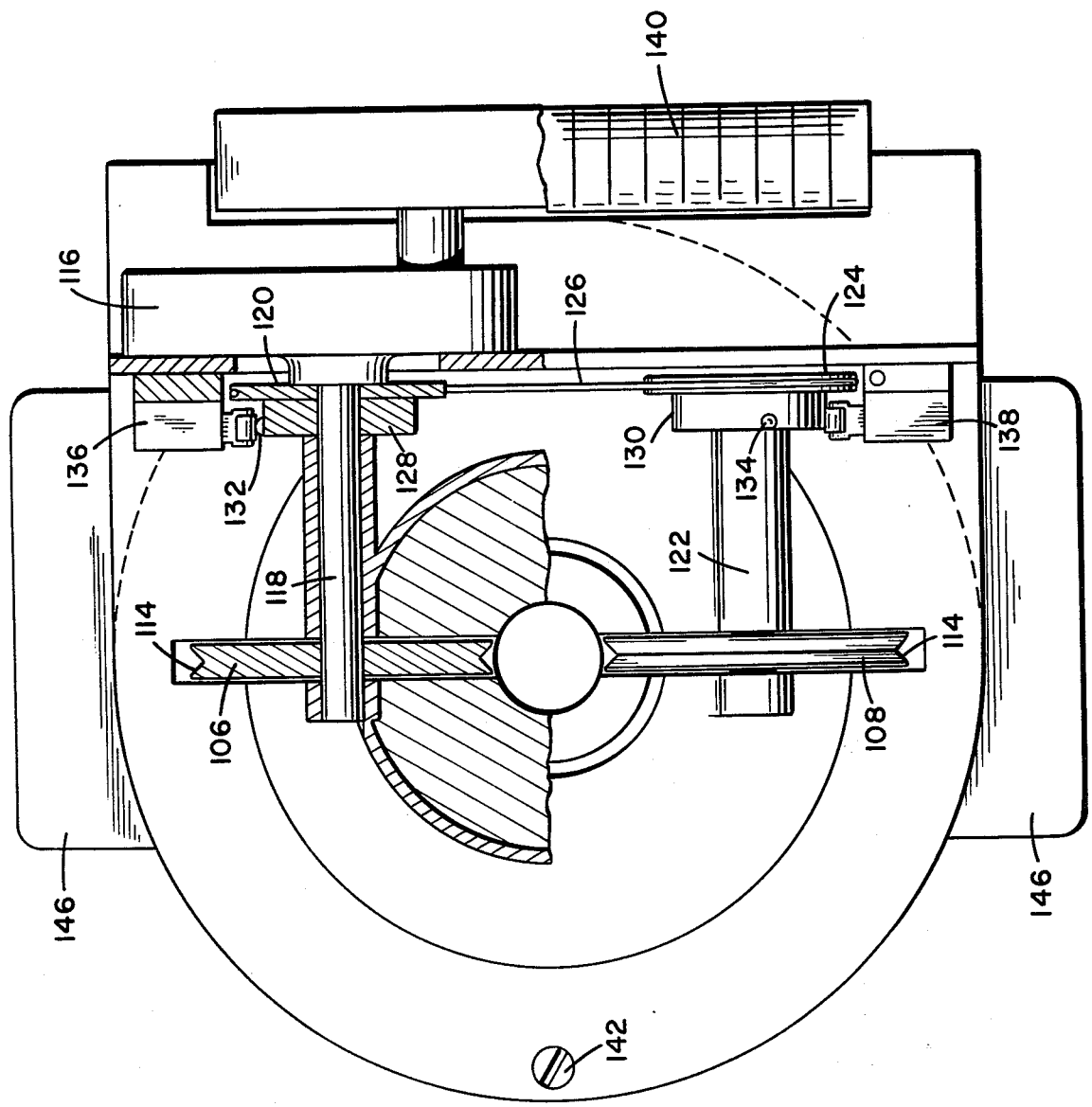
FIG. 7 is a top view, in partial cross section, of the elevator mechanism illustrated in FIG. 6.

With reference now to FIGS. 6 and 7, the structure of the elevator mechanism will be described. Initially, it should be noted that the entire elevator mechanism is mounted in base 12, separate and apart from the top assembly 14. Yet the mechanism is positioned in alignment with the elevator opening 30 in plate 28.

Immediately below the elevator opening 30 is a detector unit designated generally at 92. This detector unit is of a well-known type including a radiation detector 94 and lead shielding 96. A well 98 including a liner 100 extends from elevator opening 30 into the region of detector 94.

A planchet 102, designed for vertical movement in well 98, is supported by a band 104, the ends of which are connected, respectively, to drums 106 and 108 at 110 and 112. As can be seen, drums 106 and 108 are grooved, at 114, to receive the bands 104. One of the drums, drum 106, for example, is driven by a motor 116 through the means of a motor shaft 118. A motor pulley 120 is also mounted on motor shaft 118. Drum 108 is mounted on a shaft 122, on which is also mounted an idler pulley 124. A belt 126 connects drive pulley 120 to idler pulley 124 in such a manner that when drum 106 rotates in a clockwise sense (FIG. 6), drum 108 rotates counterclockwise.

A cylindrical cam support 128 is mounted on motor shaft 118, and a similar support 130 associates with shaft 122. Cams 132 and 134 are positioned, respectively, on cam supports 128 and 130, and associate with microswitches 136 and 138. The function of microswitches 136 and 138 is to ensure that the elevator completes its downward and upward movements before a sampling is initiated and before the sprocket gear is indexed. This is explained in U.S. Pat. No. 4,001,584. Adjustments 144 are provided to change the relative positions of microswitches 136 and 138 relative to cams 132 and 134.

The shielding 96 is in the lower region of base 12, and the respective drums 106 and 108 are mounted in the upper portion. In this regard, it should be noted that the drum assembly is pivotally mounted with respect to the shielding and detector assemblies by means of a hinge 140. Accordingly, if there is a spill within the well 98, the upper section of the elevator mechanism can be pivoted at hinge 140, the liner removed, and the well cleaned. A hold-down screw 142 is provided to lock the upper portion of the elevator mechanism to the lower portion. By fabricating the elevator mechanism in two sections, it is possible to perform a cleaning operation without the necessity of removing the heavy shielding and detector. On the other hand, if it is desired to remove the shielding and detector, the entire elevator mechanism can be removed with the aid of ears 146.

Above, a specific embodiment of the present invention has been described. It should be appreciated, however, that this embodiment was described for purposes of illustration only, without any intention of limiting the scope of the present invention. Rather, it is the intention that the present invention be limited not by the above but only as is defined in the appended claims.

What is claimed:

1. An apparatus for automatically conveying a plurality of samples supported by a puck chain to a detection zone, and for individually studying the characteristics of such samples, the apparatus comprising: a base; a planar top assembly mounted on said base and forming the upper surface thereof; an elevator opening in said top assembly for permitting said samples to enter the confines of said base; detector means mounted within said base and in alignment with said elevator opening; elevator means within said base and in alignment with said elevator opening, for sequentially transporting said samples from said top assembly to said detector means, and for returning the same to said top assembly; drive means on said top assembly adjacent said elevator opening, said drive means including a sprocket having teeth for associating with pucks of said puck chain to sequentially pull said samples into alignment with said elevator opening; and first guide means following the contour of said sprocket; said first guide means, in a first position, being spaced from said sprocket so as to enable said puck chain to pass between said sprocket and said first guide means while being driven by said sprocket.

2. The apparatus recited in claim 1, and further comprising a disposal opening in said top assembly adjacent said elevator opening and generally in the region between said sprocket and said first guide means.

3. The apparatus recited in claim 2, and further comprising closure means for selectively opening and closing said disposal opening.

4. The apparatus recited in claim 1, and further comprising second guide means spaced from and following the general contour of said first guide means for guiding said puck chain between said first and said second guide means.

5. The apparatus recited in claim 4, wherein said first guide means and said second guide means are together pivotable relative to said sprocket means so that in one position, the puck chain is guided between said first and second guide means and is driven by said sprocket, and in a second position, said chain is guided between said second guide means and said sprocket and is driven by said sprocket.

6. The apparatus recited in claim 5, wherein said first guide means is a guide rail; and wherein said second guide means is a retainer wall.

7. The apparatus recited in claim 6, wherein said guide rail and said retainer wall are connected together and wherein such connection is such that test tubes of varying sizes are permitted to pass therebetween.

8. The apparatus recited in claim 1, wherein said puck chain is comprised of a plurality of cylindrical pucks adapted to slide along said transport surface and to accept test tubes in the respective central openings therein; wherein each of said pucks has first and second spaced apart circumferential grooves therein; and wherein an "S" link resides in each groove of each puck to associate each puck with its respective neighbor pucks.

9. The apparatus recited in claim 1, wherein said elevator means comprises: a planchet vertically movable from said top assembly to said detector means, for guiding said test tubes into said detector means; motive means for controlling the movement of said planchet; and guide means for guiding said test tubes during their travel from said top assembly to said detector means.

10. The apparatus recited in claim 9, wherein said motive means comprises first and second oppositely rotatable take-up drums spaced apart from one another, and first and second cables connected, respectively, to said first and second drums and to opposite sides of said planchet; wherein simultaneous rotation of said drums in a first sense causes said planchet to move from said top assembly to said detector means, and rotation in a second sense causes said planchet to move from said detector means to said top assembly.

11. For use in an automatic sample changer wherein a plurality of test tubes are supported on a planar top assembly, are sequentially driven into an elevator region, and are then sequentially lowered from the top assembly to a detector region, a transport chain comprising: a plurality of cylindrical pucks, each having a flat bottom surface for resting on said top assembly and a cylindrical central opening extending perpendicular to said flat bottom surface for receiving a test tube; a first circumferential groove on the outer surface of each puck and aligned parallel to said bottom surface; and first generally rigid "S" links associating with each said puck, oppositely aligned, and associating, respectively, with only two neighboring pucks.

12. The transport chain recited in claim 11, wherein said "S" links are sized so that each puck is in intimate contact with its neighboring pucks.

13. The transport chain recited in claim 11, and further comprising, in each said puck, a second groove spaced from said first groove, a second "S" link mounted in said second groove, wherein said first and second "S" links are oppositely oriented.

* * * * *